(12) United States Patent
Brugler et al.

(10) Patent No.: US 8,875,052 B2
(45) Date of Patent: Oct. 28, 2014

(54) KEYSTROKE ACTIVATED DYNAMIC TASK MENU

(75) Inventors: Thomas Stanton Brugler, Fuquay-Varina, NC (US); Todd Michael Eischeid, Cary, NC (US); Mark E. Molander, Cary, NC (US); Kerry A. Ortega, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 12/360,034

(22) Filed: Jan. 26, 2009

(65) Prior Publication Data

US 2010/0192092 A1  Jul. 29, 2010

(51) Int. Cl.
G06F 3/048 (2013.01)
G06F 3/0489 (2013.01)
G06F 3/0481 (2013.01)
G06F 3/0482 (2013.01)

(52) U.S. Cl.
CPC ............ *G06F 3/0489* (2013.01); *G06F 3/0481* (2013.01); *G06F 3/0482* (2013.01)
USPC .......................................... 715/810; 715/856

(58) Field of Classification Search
USPC .......................................................... 715/856
See application file for complete search history.

(56) References Cited

U.S. PATENT DOCUMENTS

| | | | |
|---|---|---|---|
| 5,963,950 A | 10/1999 | Nielsen et al. | 707/102 |
| 6,307,544 B1 | 10/2001 | Harding | 345/338 |
| 6,311,323 B1* | 10/2001 | Shulman et al. | 717/111 |
| 2005/0024239 A1* | 2/2005 | Kupka | 341/20 |
| 2005/0044529 A1* | 2/2005 | Simons et al. | 717/120 |
| 2005/0125744 A1 | 6/2005 | Hubbard et al. | 715/824 |
| 2006/0184880 A1* | 8/2006 | Bala | 715/705 |
| 2007/0011624 A1 | 1/2007 | Olsen et al. | 715/811 |
| 2007/0288887 A1* | 12/2007 | Pepin et al. | 717/105 |
| 2009/0150541 A1* | 6/2009 | Georgis | 709/224 |
| 2009/0210821 A1 | 8/2009 | Omiya | |
| 2010/0122194 A1* | 5/2010 | Rogers | 715/769 |

FOREIGN PATENT DOCUMENTS

| | | |
|---|---|---|
| JP | 2004054854 | 2/2004 |
| JP | 2007025998 | 2/2007 |
| JP | 2008009712 | 1/2008 |
| JP | 2008520012 | 6/2008 |
| JP | 2008535052 | 8/2008 |
| WO | WO2006053266 | 5/2006 |
| WO | WO2006101507 | 9/2006 |
| WO | WO2008001749 | 1/2008 |

* cited by examiner

*Primary Examiner* — Peiyong Weng
(74) *Attorney, Agent, or Firm* — Zilka-Kotab, PC

(57) ABSTRACT

According to one embodiment, a method includes detecting textual input from a user and determining a position of a cursor associated with a user input device on an electronic page. In addition, the method includes selecting entries based on the textual input and the position of the cursor. Also, the method includes generating a task list having the selected entries and outputting the task list to a graphical display device.

20 Claims, 7 Drawing Sheets

KEYSTROKE ACTIVATED DYNAMIC TASK MENU

BACKGROUND

The present invention relates to software systems management, and more particularly, this invention relates to context task management.

As functionality grows within a software systems management application, the tasks that can be performed (e.g., powering on, powering off, starting remote console, etc.) on a given resource such as a server also grow. In addition, general tasks not requiring a context also grow. This growth in the number of tasks that can be performed can cause context menus and navigation trees to become prohibitively large. A simple method to allow the user to more immediately access a desired task would be very helpful to better manage these situations.

SUMMARY

According to one embodiment, a method includes detecting textual input from a user and determining a position of a cursor associated with a user input device on an electronic page. In addition, the method includes selecting entries based on the textual input and the position of the cursor. Also, the method includes generating a task list having the selected entries and outputting the task list to a graphical display device.

In another embodiment, a computer program product includes a computer usable medium having computer usable program code embodied therewith, the computer usable program code comprising computer usable program code configured to detect textual input from a user. Also, the computer usable program code is configured to determine a position of a cursor associated with a user input device on an electronic page and to select entries based on the textual input and the position of the cursor. In addition, the computer usable program code is configured to generate a task list having the selected entries and to output the task list to a graphical display device.

According to another embodiment, a method comprises detecting textual input from a user and determining a position of a cursor associated with a user input device on an electronic page. In addition, the method includes selecting entries based on the textual input and the position of the cursor, wherein selecting the entries includes determining an item that the cursor is hovering over, and selecting entries having a predefined association with the item. Also, the method includes generating a task list having the selected entries and outputting the task list to a graphical display device, wherein the task list is displayed at a predetermined position relative to the cursor or an item that the cursor is hovering over, with the proviso that no selection of an item on the page by the cursor need be performed for outputting the task list.

Other aspects and embodiments of the present invention will become apparent from the following detailed description, which, when taken in conjunction with the drawings, illustrate by way of example the principles of the invention.

DETAILED DESCRIPTION

Figure 1:
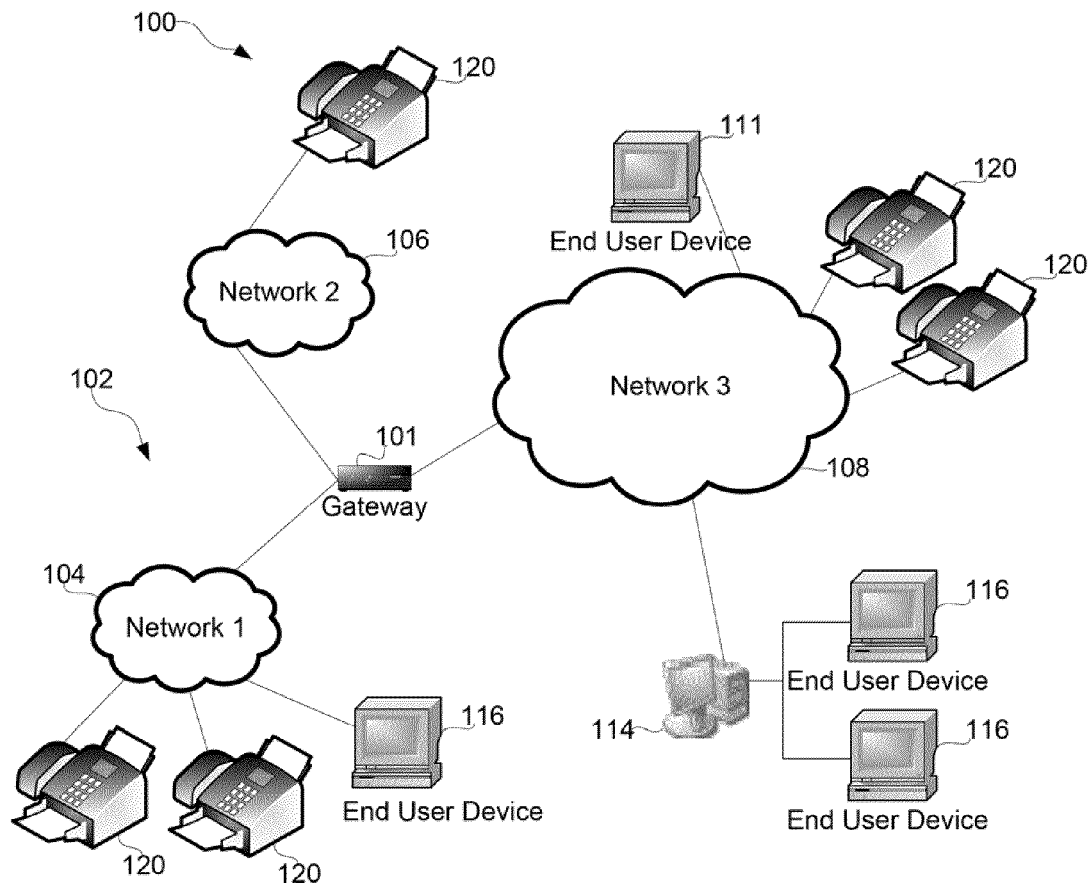
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of task management software and methods.

In one general embodiment, a method comprises detecting textual input from a user; determining a position of a cursor associated with a user input device on an electronic page; selecting entries based on the textual input and the position of the cursor; generating a task list having the selected entries; and outputting the task list to a graphical display device.

In another general embodiment, a computer program product comprises a computer usable medium having computer usable program code embodied therewith, the computer usable program code including: computer usable program code configured to detect textual input from a user; computer usable program code configured to determine a position of a cursor associated with a user input device on an electronic page; computer usable program code configured to select entries based on the textual input and the position of the cursor; computer usable program code configured to generate a task list having the selected entries; and computer usable program code configured to output the task list to a graphical display device.

In another general embodiment, a method comprises detecting textual input from a user; determining a position of a cursor associated with a user input device on an electronic page; selecting entries based on the textual input and the position of the cursor, wherein selecting the entries includes determining an item that the cursor is hovering over, and selecting entries having a predefined association with the item; generating a task list having the selected entries; and outputting the task list to a graphical display device, wherein the task list is displayed at a predetermined position relative to the cursor or an item that the cursor is hovering over, with the proviso that no selection of an item on the page by the cursor need be performed for outputting the task list.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5A:
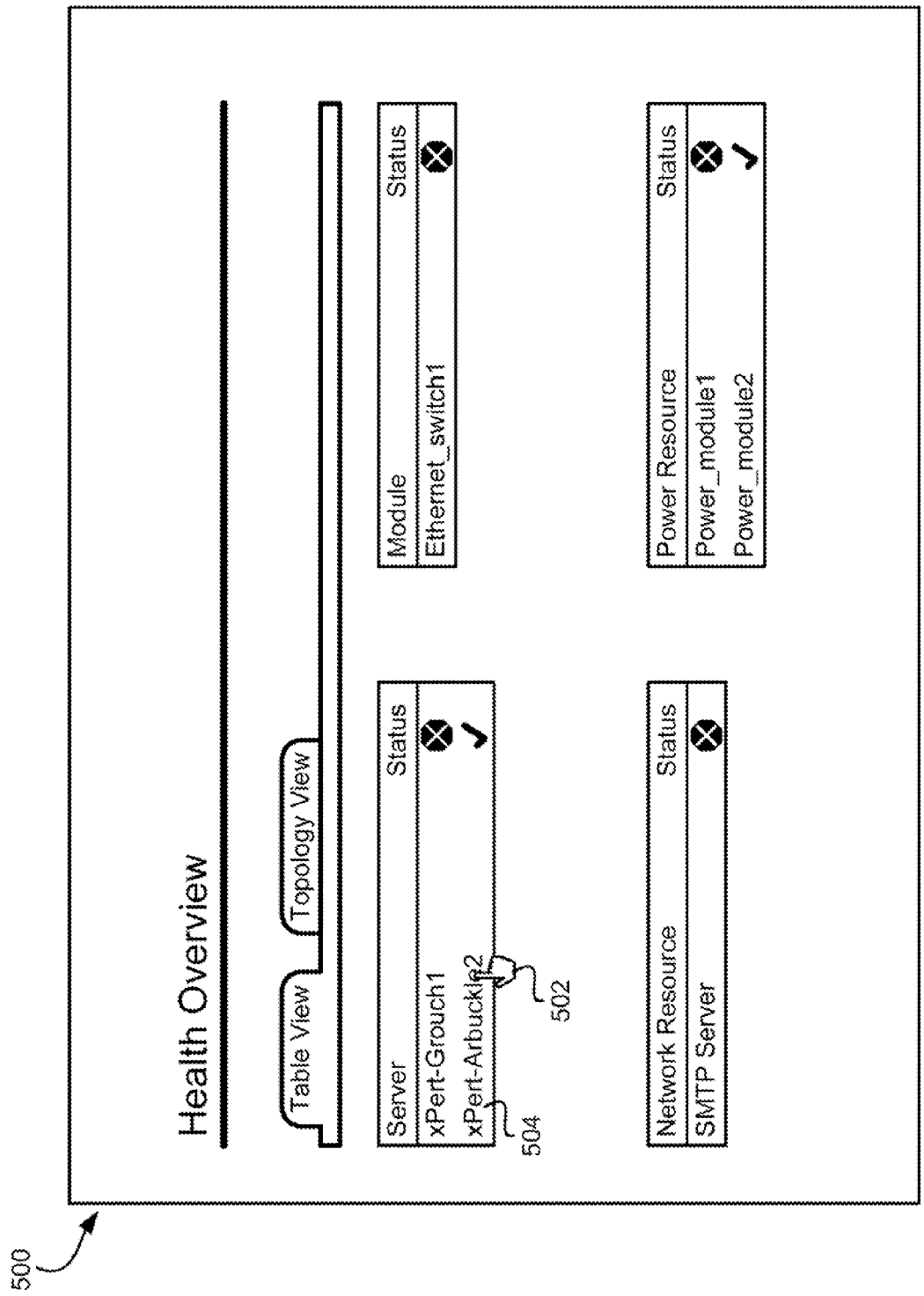
FIGS. 5A-5C are simplified drawings of a user interface incorporating the floating task list according to one embodiment.
Figure 5B:
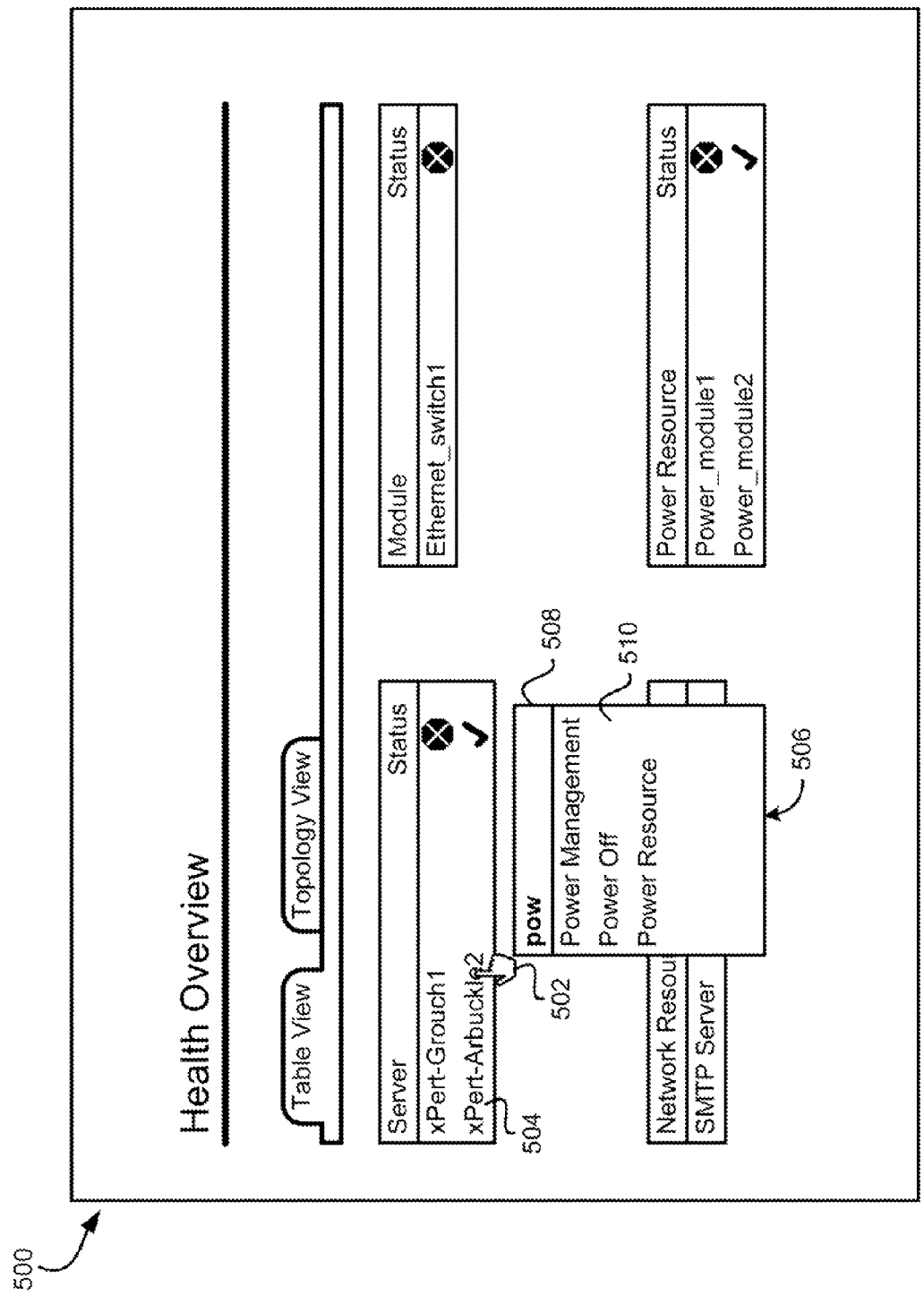
Figure 5C:
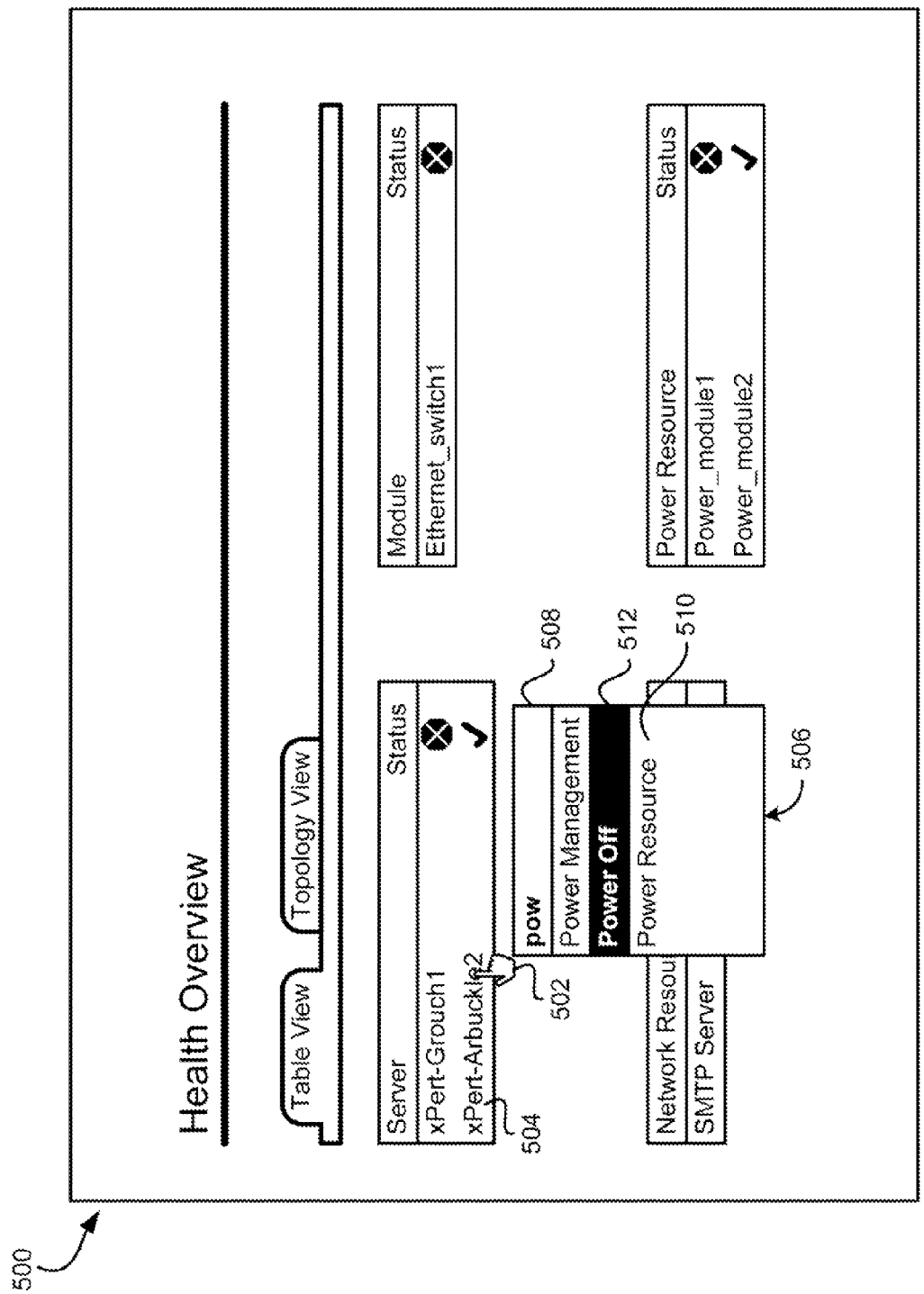

With reference to FIGS. 5A-5C, according to one embodiment, a method of providing a user with access to a floating task list may be described. With reference to FIG. 5A, from within a systems management application 500, a user may be able to position a pointer, such as a mouse cursor 502, over a particular object, such as a resource 504. The mouse cursor may be hovered for a period of time before the user begins to type a string of characters representing a desired task, or the user may begin typing immediately. Now referring to FIG. 5B, once the user begins to type, the characters being typed may appear in a window 508 in a floating task list 506. After one or more characters have been typed, the task list 506 may show available tasks which match a portion and/or all of the typed characters. The floating task list 506 may immediately, or as quickly as allowed by the system configuration, appear (where the top left corner of the task list box may be positioned at a location at or near the mouse cursor). This locational information may help the user to understand that the task list 506 applies to the object, link, etc., that the mouse cursor 502 is hovering over. Also, the tasks 510 contained in the task list 506 may apply to the resource 504 that the mouse cursor 502 is hovering over. If the mouse cursor 502 is not hovering over a particular resource, then the available tasks in the task list 506 may be those which do not require a context. This method of displaying available tasks offers improved ease of access to available tasks over current methods which employ hierarchical navigation trees (e.g., the user may simply hold or hover the mouse over a resource and begin typing).

According to some embodiments, the task list 506 can be comprised of a number of simpler controls. It may contain a standard text input box 508 to provide feedback to the user about what the user has typed on the keyboard. Below the text box 508 there may be a list of available tasks 510, filtered by the text that the user has entered. The list of tasks 510 may update on a per keystroke basis, after a predetermined amount of time, etc., to reflect the best match for the text in the text box 508. Now with reference to FIG. 5C, the tasks on the task list 506 may be able to be executed either by clicking on the textual representation of the task with the mouse cursor 502 (similar to selecting a menu item) or by using standard keyboard methods to set the focus 512 on the desired item and execute it (e.g., use the tab key to set the selection on the desired item and then press the enter key to execute).

For example, without clicking any of the mouse buttons, the user may start to type "pow" on the keyboard and the task list 506 may appear, perhaps near the point of the cursor 502. The first keystroke may serve to both trigger the task list display and to indicate the first character that the user wishes to begin filtering on. The characters that the user types are reflected in the text box 508 at the top, and some or all tasks 510 related to the hovered-over resource 504 may appear in the lower portion of the task list 506. This task list 506 may be searched based on the user's entered characters. Multiple search criteria may be employed, such as exact string matching, task name+metadata matching, whole-word matching, etc. The filtered list of tasks can then be selected/executed by the user, either with the mouse, keyboard navigation and selection, voice activated commands, etc.

In some embodiments, the task list may include information beyond just displaying the tasks available. For example, additional information may include a frequency count that indicates the number of times that the current user, all users, and/or selected users have performed the operation or task listed in the task list; the ability to obtain further information about an operation, function, task, etc., in the task list prior to performing the action and selecting the task from the task list; the ability for a user to add custom text and/or graphics to the task list that other users could later access, etc.

This methodology and systems employing such methodology differ from a standard context menu paradigm in that it is a dynamic, filtered list of items as opposed to a static menu of all available actions contained in standard context menu paradigms. This is very beneficial, as current systems management applications are quite function laden. Each resource could have many actions associated with it that preclude efficient visual scanning for the tasks of interest. Menu items on existing context menus also have submenus, and the current invention would not contain submenus according to some embodiments. The filtered list shown to the user may be flat and not hierarchical according to preferred embodiments. It also differs from standard context menu paradigms in that if an object is selected, or otherwise has the focus, somewhere in the user interface, it would not have to be deselected in order to bring up the task list, because it only requires hover.

The examples above describe actions for a single resource. If multiple items were selected and the user began typing characters, then the task menu would still appear and be filtered for the tasks that would be possible on the selected items, according to multiple embodiments.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A facsimile machine 120 or series of facsimile machines 120 may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

Figure 2:
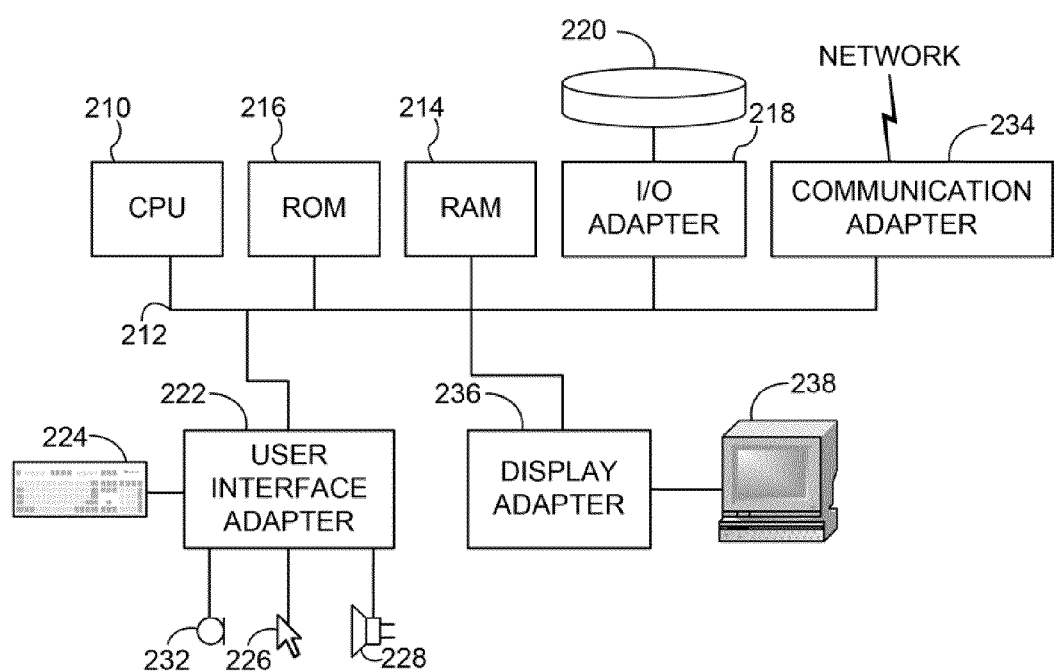
FIG. 2 shows a representative hardware environment that may be associated with the servers and/or clients of FIG. 1, in accordance with one embodiment.

FIG. 2 shows a representative hardware environment associated with a user device 116 of FIG. 1, in accordance with one embodiment. Such figure illustrates a typical hardware configuration of a workstation having a central processing unit 810, such as a microprocessor, and a number of other units interconnected via a system bus 812.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
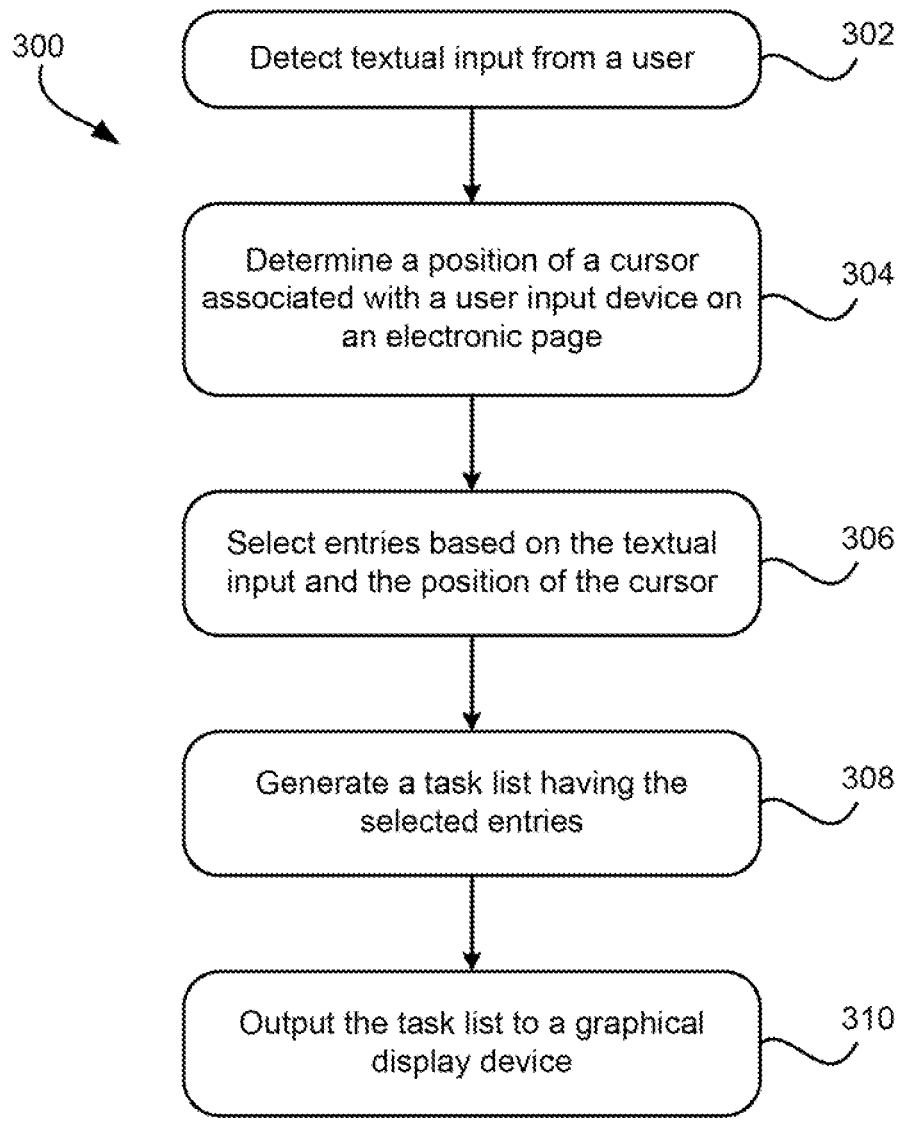
FIG. 3 is a flowchart of a method according to one embodiment.

FIG. 3 is a flowchart of a method 300 according to one embodiment. The method 300 may be used in conjunction with a computer system, server, group of servers, etc. Of course, the method 300 may be used in any desired environment, and is not limited in any way by the examples presented herein.

In operation 302, textual input from a user is detected. The textual input may be entered via keyboard, mouse selections, audible commands, etc. Textual input may further include alphabetical, numerical and/or symbolic characters, punctuation, spaces, etc.

In operation 304, a position of a cursor associated with a user input device on an electronic page is determined. A user input device may include a keyboard, mouse, trackball, microphone, etc. An electronic page may include a web page, word processing document, computer desktop, etc.

In operation 306, entries are selected based on the textual input and the position of the cursor. For example, if the cursor is hovering over an icon representing a server, and the textual input includes the term "Johnson," then entries which are stored on the server and contain the term "Johnson" may be selected.

In some embodiments, selecting the entries may include selecting entries having a same sequence of characters as the textual input. For example, a user may input "red," and entries may be returned such as "redness," "ordered," "tiredness," etc.

In more embodiments, the task list may be updated with each character of the textual input received. For example, if a user inputs "key," the task list may include "Florida Keys" and "keyhole," but if the user then inputs an "s" to form "keys," the task list may only include "Florida Keys." This concept may be propagated to more complex associations and task lists, and is not limited to simple word arrangements.

In operation 308, a task list is generated having the selected entries. In some embodiments, only the most relevant tasks may appear in the task list, according to an algorithm for determining task relevance to the textual input. For example, only the 5 most relevant entries, only the 10 most relevant entries, only the 20 most relevant entries, etc. In addition, user preferences may be used to determine the most relevant entries, such as the task most often chosen based on the combination of mouse cursor position and textual input.

In operation 310, the task list is output to a graphical display device. For example, the graphical display device may include a monitor, LCD screen, Plasma display, rear projection screen, etc. Also, the task list may appear near a position of the mouse cursor on the graphical display device, and may include the entries deemed most relevant at the top of the task list, in alphabetical order, according to date, etc. Also, the task list may include a scroll bar, preferably on the right side of the task list, for scrolling through the entries if there are too many to list in a conveniently sized task list.

In some approaches, selecting the entries may include determining an item, e.g., object, link, word, picture, etc., that the cursor is hovering over on a graphical display device, and selecting entries having a predefined association with the item. For example, if the mouse cursor is hovering over a server, then documents and files stored on that server may be selected. In another example, if the muse cursor is hovering over a picture including "Mary Smith," then each picture also containing "Mary Smith" may be selected. Any other type of association may also be used to select associated items, such as location, date, size, similar patterns, etc.

In further approaches, default entries may be selected if the cursor is not positioned over an item. For example, if the mouse cursor is not hovering over any item, then the returned entries could be comprised of tasks that are general in nature and do not apply to any particular type of item or object. For example, overall display preferences could be one such task. In another example, entries from a predetermined default list, which may be selected by a user, may be returned.

In some embodiments, the task list may be displayed at a predetermined position relative to the cursor or an item that the cursor is hovering over, such as having a corner of the task list appear at the point of the cursor, having the task list appear near the top, bottom, or side of a display, having the task list appear from a user chosen location, etc.

In some more embodiments, the method 300 may further comprise a text box adjacent the task list showing the textual input. This allows the user to manipulate the textual input, thereby changing the entries in the task list. This also allows the user to input additional textual terms, thereby creating a list of textual inputs from which the entries may be associated and selected.

In some embodiments of method 300, no selection of an item on the page by the cursor need be performed for outputting the task list. For example, a user may not be required to select anything on the electronic page or graphical display in order for the task list to be output to the user.

In some more embodiments, the task list may be visually connected to an item over which the cursor is hovering when the textual input is detected. For example, if the mouse cursor is hovering over a line of text which represents a server, the task list may be selectable through a hypertext link that forms over the line of text representing the server. In another example, the task list may appear adjacent to an icon representing a server which the cursor is hovering over.

In even more embodiments, the method 300 may further comprise determining selection of an item by the cursor in any manner known in the art and typically as a result of user input, and not deselecting the item upon determining that the position of the cursor is over a second item and detecting textual input from the user, wherein the entries may be selected based on the position of the cursor over the second item.

In some approaches, the task list does not include submenus.

In some more approaches, the method 300 may further comprise detecting selection of one of the entries of the task list and performing an action associated with the selected entry.

In some embodiments, a statistic may be output for at least one of the entries of the task list. For example, the statistic may be related to a relevance of the entry to the textual input and cursor position, it may be related to a likelihood of selection by the user based on past selections, etc.

In more embodiments, the method 300 may further comprise receiving a request for additional information about one of the entries in the task list. For example, the user may select a link which requests location of an entry, relevance of an entry, size of an entry, additional information pertaining to execution of the item such as function, purpose, brief description, etc.

In even more embodiments, at least one of the entries for selection may have been added by an end user.

Figure 4:
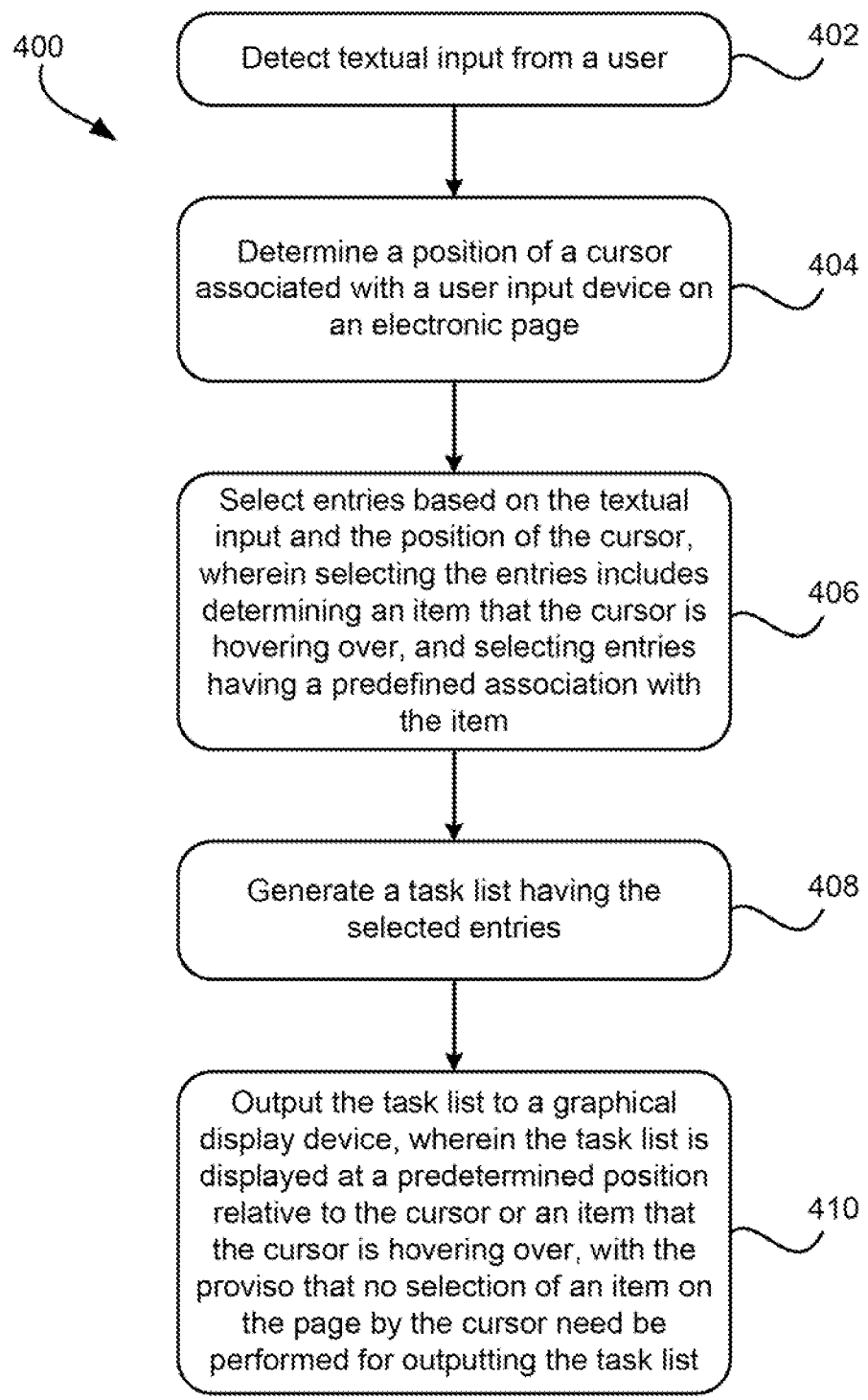
FIG. 4 is a flowchart of a method according to another embodiment.

FIG. 4 is a flowchart of a method 400 according to one embodiment. The method 400 may be used in conjunction with a computer system, server, group of servers, etc. Of course, the method 400 may be used in any desired environment, and is not limited in any way by the examples presented herein.

In operation 402, textual input from a user is detected. The textual input may be entered via keyboard, mouse selections, audible commands, etc. Textual input may further include alphabetical, numerical and/or symbolic characters, punctuation, spaces, etc.

In operation 404, a position of a cursor associated with a user input device on an electronic page is determined. A user input device may include a keyboard, mouse, trackball, microphone, etc. An electronic page may include a web page, word processing document, computer desktop, etc.

In operation 406, entries are selected based on the textual input and the position of the cursor, wherein selecting the entries includes determining an item that the cursor is hovering over, and selecting entries having a predefined association with the item. For example, if the cursor is hovering over an icon representing a server, and the textual input includes the term "Johnson," then entries which are stored on the server and contain the term "Johnson" may be selected.

In operation 408, a task list is generated having the selected entries. In some embodiments, only the most relevant tasks may appear in the task list, according to an algorithm for determining task relevance to the textual input. For example, only the 5 most relevant entries, only the 10 most relevant entries, only the 20 most relevant entries, etc. In addition, user preferences may be used to determine the most relevant entries, such as the task most often chosen based on the combination of mouse cursor position and textual input.

In operation 410, the task list is output to a graphical display device, wherein the task list is displayed at a predetermined position relative to the cursor or an item that the cursor is hovering over, with the proviso that no selection of an item on the page by the cursor need be performed for outputting the task list. For example, the graphical display device may include a monitor, LCD screen, Plasma display, rear projection screen, etc. Also, the task list may appear near a position of the mouse cursor on the graphical display device, and may include the entries deemed most relevant at the top of the task list, in alphabetical order, according to date, etc. Also, the task list may include a scroll bar, preferably on the right side of the task list, for scrolling through the entries if there are too many to list in a conveniently sized task list.

In some embodiments, method 400 may further comprise outputting a text box adjacent the task list showing the textual input. This allows the user to manipulate the textual input, thereby changing the entries in the task list. This also allows the user to input additional textual terms, thereby creating a list of textual inputs from which the entries may be associated and selected.

In more embodiments, the task list may be updated with each character of the textual input received. For example, if a user inputs "key," the task list may include "Florida Keys" and "keyhole," but if the user then inputs an "s" to form "keys," the task list may only include "Florida Keys." This concept may be propagated to more complex associations and task lists, and is not limited to simple word arrangements.

In some more embodiments, method 400 may further comprise determining selection of an item by the cursor in any manner known in the art and typically as a result of user input, and not deselecting the item upon determining that the position of the cursor is over a second item and detecting textual input from the user, wherein the entries are selected based on the position of the cursor over the second item.

It will be clear that the various features of the foregoing methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
  detecting textual input from a user;
  determining, in response to the detecting the textual input, a position of a mouse cursor associated with a user input device in relation to items displayed on an electronic page;
  selecting entries to include in a task list based on the textual input and the position of the mouse cursor in relation to one item on the electronic page;
  generating the task list having the selected entries; and
  outputting the task list to the electronic page displayed on a graphical display device,
  wherein the selecting entries to include in the task list based on the position of the mouse cursor comprises determining when the mouse cursor is hovering over an item and selecting entries having a predefined association with the item or selecting default entries when the mouse cursor is not positioned over an item having entries that have a predefined association therewith.

2. The method of claim 1, wherein the task list displays entries deemed most relevant at a top of the task list.

3. The method of claim 1, further comprising generating a text box adjacent the task list showing the textual input after detecting the textual input from the user, with the proviso that no selection of any item on the page by the mouse cursor need be performed for outputting the task list and for outputting the text box.

4. The method of claim 1, wherein the task list is displayed at a predetermined position relative to the mouse cursor or the item that the mouse cursor is hovering over, and wherein a keyboard is used by the user to input the textual input.

5. The method of claim 3, wherein the text box is adapted for allowing manipulation of the textual input to allow the user to input additional textual terms, thereby creating a list of textual inputs from which the selected entries are based, and further comprising dynamically updating the task list to reflect entries associated with the textual input including the additional textual terms and the position of the mouse cursor.

6. The method of claim 1, wherein selecting the entries includes selecting entries having a same sequence of characters as the textual input, wherein the task list is updated with each character of the textual input received.

7. The method of claim 1, wherein the items represent physical or logical resources, and wherein the selected entries are tasks that affect the physical or logical resources when performed, and wherein selecting a task from the task list causes the task to be performed to affect a physical or logical resource being represented by the item over which the mouse cursor is hovering.

8. The method of claim 1, with the proviso that no selection of any item on the page by the mouse cursor need be performed for outputting the task list.

9. The method of claim 1, wherein the task list is visually connected to the item over which the mouse cursor is hovering when the textual input is detected.

10. The method of claim 1, further comprising:
  determining selection of at least one item by the mouse cursor;
  determining that the position of the mouse cursor is over a second item or determining that the second item has also been selected; and
  detecting textual input from the user, wherein the entries to include in the task list are selected based on the textual input, the at least one item, and the second item.

11. The method of claim 1, with the proviso that the task list does not include submenus.

12. The method of claim 1, further comprising detecting selection of one of the entries of the task list and performing an action associated with the selected entry.

13. The method of claim 1, wherein a statistic is output for at least one of the entries of the task list, the statistic being related to a relevance of the at least one of the entries to the textual input and the cursor position.

14. The method of claim 1, further comprising:
outputting a link to request additional information about one of the entries in the task list to the electronic page; and
receiving a request for additional information about one of the entries in the task list via the link.

15. The method of claim 1, wherein at least one of the entries for selection has been added by an end user.

16. A computer program product, the computer program product comprising: a non-transitory computer usable medium having computer usable program code embodied therewith, the computer usable program code comprising:
computer usable program code configured to detect textual input from a user;
computer usable program code configured to determine, in response to detecting the textual input, a position of a mouse cursor associated with a user input device in relation to items displayed on an electronic page;
computer usable program code configured to select entries to include in a task list based on the textual input and the position of the mouse cursor in relation to one item on the electronic page;
computer usable program code configured to generate the task list having the selected entries;
computer usable program code configured to generate a text box adjacent the task list showing the textual input after detecting the textual input from the user; and
computer usable program code configured to output the text box and the task list to the electronic page displayed on a graphical display device, with the proviso that no selection of any item on the page by the mouse cursor need be performed for outputting the task list and for outputting the text box, and wherein the text box is adapted for allowing manipulation of the textual input to allow the user to input additional textual terms, thereby creating a list of textual inputs from which the selected entries are based; and
computer usable program code configured to dynamically update the task list to reflect entries associated with the textual input including the additional textual terms and the position of the mouse cursor,
wherein the computer usable program code configured to select entries to include in the task list based on the position of the mouse cursor comprises determining when the mouse cursor is hovering over an item and selecting entries having a predefined association with the item or selecting default entries when the mouse cursor is not positioned over an item having entries that have a predefined association therewith.

17. A method, comprising:
detecting textual input from a user;
determining, in response to the detecting the textual input, a position of a mouse cursor associated with a user input device in relation to items displayed on an electronic page;
outputting a text box showing the textual input after detecting the textual input from the user;
selecting entries to include in a task list based on the textual input and the position of the mouse cursor in relation to one item on the electronic page, wherein an item that the mouse cursor is hovering over is determined, and entries are selected that have a predefined association with the item when the mouse cursor is hovering over the item, otherwise default entries are selected when the mouse cursor is not positioned over an item having entries that have a predefined association therewith;
generating the task list having the selected entries;
outputting the task list to the electronic page displayed on a graphical display device, wherein the task list is displayed at a predetermined position relative to the mouse cursor or the item that the mouse cursor is hovering over, wherein the task list is adjacent the text box, with the proviso that no selection of any item on the page by the mouse cursor need be performed for outputting the task list;
outputting a link to request additional information about one of the entries in the task list to the electronic page; and
receiving a request for additional information about one of the entries in the task list via the link,
wherein at least one of the entries for selection is a task hat affects the item that the mouse cursor is hovering over.

18. The method of claim 17, with the proviso that no selection of any item on the page by the mouse cursor need be performed for outputting the text box.

19. The method of claim 17, wherein the task list is updated with each character of the textual input received.

20. The method of claim 17, further comprising:
determining selection of at least one item by the mouse cursor;
determining that the position of the mouse cursor is over a second item or determining that the second item has also been selected; and
detecting textual input from the user, wherein the entries to it dude in the task list are selected based on-the textual input, the at least one item, and the second item,
wherein the task list displays entries deemed most relevant at a top of the task list, and
wherein a statistic is output for at least one of the entries of the task list, the statistic being related to a relevance of the at least one of the entries to the textual input and the cursor position.

* * * * *